US011022784B1

(12) United States Patent
Wheelwright et al.

(10) Patent No.: US 11,022,784 B1
(45) Date of Patent: Jun. 1, 2021

(54) USE OF FOLDED OPTICS TO REDUCE VOLUME IN A VIRTUAL-REALITY SYSTEM

(71) Applicant: Facebook Technologies, LLC, Menlo Park, CA (US)

(72) Inventors: Brian Wheelwright, Sammamish, WA (US); Ying Geng, Bellevue, WA (US); Fenglin Peng, Kirkland, WA (US); Yusufu Njoni Bamaxam Sulai, Bothell, WA (US); Jacques Gollier, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 92 days.

(21) Appl. No.: 16/104,453

(22) Filed: Aug. 17, 2018

(51) Int. Cl.
| | | |
|---|---|---|
| *G02B 17/04* | (2006.01) | |
| *G02B 17/00* | (2006.01) | |
| *G02B 27/28* | (2006.01) | |
| *G02F 1/13357* | (2006.01) | |
| *G02B 27/01* | (2006.01) | |
| *G02F 1/1335* | (2006.01) | |
| *G02F 1/13363* | (2006.01) | |

(52) U.S. Cl.
CPC ......... *G02B 17/004* (2013.01); *G02B 17/006* (2013.01); *G02B 27/286* (2013.01); *G02B 27/0172* (2013.01); *G02F 1/13355* (2021.01); *G02F 1/133536* (2013.01); *G02F 1/133567* (2021.01); *G02F 1/133605* (2013.01); *G02F 1/133638* (2021.01)

(58) Field of Classification Search
CPC ........................ G02B 27/0172; G02B 5/3083; G02B 27/286; G02B 27/144; G02B 5/30; G02B 2027/013; G02B 5/3025; G02B 2027/011; G02F 1/133605; G02F 1/133536; G02F 1/13362; G02F 1/133606; G02F 2001/13355; G02F 2001/133567; G02F 2001/133638
See application file for complete search history.

(56) References Cited

U.S. PATENT DOCUMENTS

| | | | | |
|---|---|---|---|---|
| 4,526,442 A | | 7/1985 | Betensky | |
| 5,541,745 A | * | 7/1996 | Fergason | ............ G02F 1/13362 349/194 |
| 5,715,023 A | * | 2/1998 | Hoppe | ................. G02B 5/3016 349/11 |
| 5,966,242 A | * | 10/1999 | Yamanaka | ......... G02B 27/0172 359/618 |
| 6,266,194 B1 | * | 7/2001 | Tanijiri | .............. G02B 27/0172 359/630 |

(Continued)

OTHER PUBLICATIONS

U.S. Office Action dated Jun. 17, 2020 in U.S. Appl. No. 15/946,685.

(Continued)

*Primary Examiner* — Christopher Stanford
(74) *Attorney, Agent, or Firm* — Weaver Austin Villeneuve & Sampson LLP

(57) ABSTRACT

Folding optics are used in conjunction with a lens system to reduce a back focal length of a head-mounted display. The lens system provides optical power to focus light from an optical display. The folding optics reflects light to fold upon itself to reduce a distance between the lens system and the optical display.

20 Claims, 5 Drawing Sheets

(56) References Cited

U.S. PATENT DOCUMENTS

| | | | |
|---|---|---|---|
| 6,271,969 B1 * | 8/2001 | Mertz | G02B 27/0172 359/489.07 |
| 6,400,493 B1 * | 6/2002 | Mertz | G02B 27/0172 359/301 |
| 6,421,183 B1 * | 7/2002 | Ophey | G02B 27/0172 349/13 |
| 6,710,928 B2 * | 3/2004 | Roest | G02B 27/0172 359/631 |
| 7,206,134 B2 | 4/2007 | Weissman et al. | |
| 7,570,427 B2 | 8/2009 | Hasman | |
| 8,009,349 B2 * | 8/2011 | McDowall | G02B 27/144 359/318 |
| 9,555,589 B1 * | 1/2017 | Ambur | G02B 5/3075 |
| 9,829,616 B2 | 11/2017 | Yun et al. | |
| 9,898,091 B2 | 2/2018 | Bristol et al. | |
| 9,977,246 B2 * | 5/2018 | Ouderkirk | G02B 27/283 |
| 10,025,060 B2 | 7/2018 | Lanman et al. | |
| 10,197,802 B2 * | 2/2019 | Hoppe | G02B 27/0149 |
| 10,394,040 B2 | 8/2019 | Gollier et al. | |
| 10,416,461 B2 | 9/2019 | Gollier et al. | |
| 10,429,656 B1 | 10/2019 | Sharma et al. | |
| 10,429,657 B1 | 10/2019 | Sharma et al. | |
| 10,429,927 B1 | 10/2019 | Sharma et al. | |
| 2005/0111101 A1 * | 5/2005 | Dike | G02B 27/0101 359/489.07 |
| 2006/0232862 A1 * | 10/2006 | Steven | G02B 3/14 359/489.07 |
| 2007/0273970 A1 * | 11/2007 | Hoppe | G02B 27/28 359/489.07 |
| 2009/0290079 A1 * | 11/2009 | Evans | G02B 30/40 349/18 |
| 2010/0177113 A1 * | 7/2010 | Gay | G02B 30/27 345/589 |
| 2011/0193814 A1 * | 8/2011 | Gay | H04N 13/395 345/173 |
| 2015/0103151 A1 * | 4/2015 | Carls | H04N 13/363 348/52 |
| 2016/0210782 A1 | 7/2016 | Thomas | |
| 2017/0227770 A1 | 8/2017 | Carollo et al. | |
| 2017/0276912 A1 | 9/2017 | Yao et al. | |
| 2018/0039052 A1 | 2/2018 | Khan et al. | |
| 2018/0113310 A1 | 4/2018 | Rolland et al. | |
| 2018/0120579 A1 | 5/2018 | Gollier et al. | |
| 2019/0243147 A1 * | 8/2019 | Smithwick | G02B 5/3025 |
| 2019/0384070 A1 | 12/2019 | Geng et al. | |
| 2020/0284963 A1 | 9/2020 | Yun et al. | |

OTHER PUBLICATIONS

Final Office Action dated Dec. 15, 2020 in U.S. Appl. No. 15/946,685.

* cited by examiner

USE OF FOLDED OPTICS TO REDUCE VOLUME IN A VIRTUAL-REALITY SYSTEM

BACKGROUND

This disclosure relates generally to near-eye-display systems, and more specifically to displays with a small form factor, a large field of view, and/or a large eye box. Near-eye, light-field displays project images directly into a user's eye, encompassing both near-eye displays and electronic viewfinders. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be light weight, and provide two-dimensional expansion with a large eye box and a wide field-of-view (FOV). In typical near-eye displays, a limit for the FOV is based on satisfying two physical conditions: (1) an occurrence of total internal reflection of image light coupled into a waveguide, and (2) an existence of a first-order diffraction caused by a diffraction grating. Conventional methods used to satisfy the above two physical conditions rely on heavy and expensive components. Further, designing a conventional near-eye display with two-dimensional expansion involving two different output grating elements that are spatially separated often results in a large form factor. Accordingly, it is challenging to design near-eye displays using conventional methods to achieve a small form factor, a large FOV, and/or a large eye box.

SUMMARY

This disclosure relates generally to a lens for a virtual-reality (VR) display. Pancake lenses have been used to provide focusing power by folding an optical path. In this disclosure, a folded optical path is used to reduce a length of an optical path for a VR system. A compromise between image quality and weight typically leads to lens systems with few elements that collectively have a long focal length and hence have a long back focal distance (BFD). The back focal distance is usually full of air and can significantly increase a volume and/or bulkiness of a head-mounted display (HMD).

The VR system can comprise a display, a lens, a partial reflector, a quarter-wave plate, and a reflective polarizer. The partial reflector, quarter-wave plate, and the reflective polarizer are used to fold light. Light is transmitted from the display, through the partial reflector (e.g., a 50/50 mirror), through the quarter-wave plate, reflected by the reflective polarizer, transmitted through the quarter-wave plate, reflected by the partial reflector, transmitted through the quarter-wave plate, and transmitted through the reflective polarizer. Light is folded on axis (e.g., with reflector planes orthogonal to the optical axis). The lens focuses light. In some embodiments, folding optics have little to no focusing power. The folding optics are used in conjunction with the lens system instead of using a folded-optics lens to replace the lens system. Though light is not significantly focused using the folding optics, light follows a folded optical path. Since light is folded, the back focal distance (BFD) is reduced (e.g., up to 3 times). Because the folding optics are not used to focus light, the elements used for the folding optics can be applied to flat surfaces, which are easier to manufacture than applying elements used for the folding optics to curved surfaces.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Figure 1:
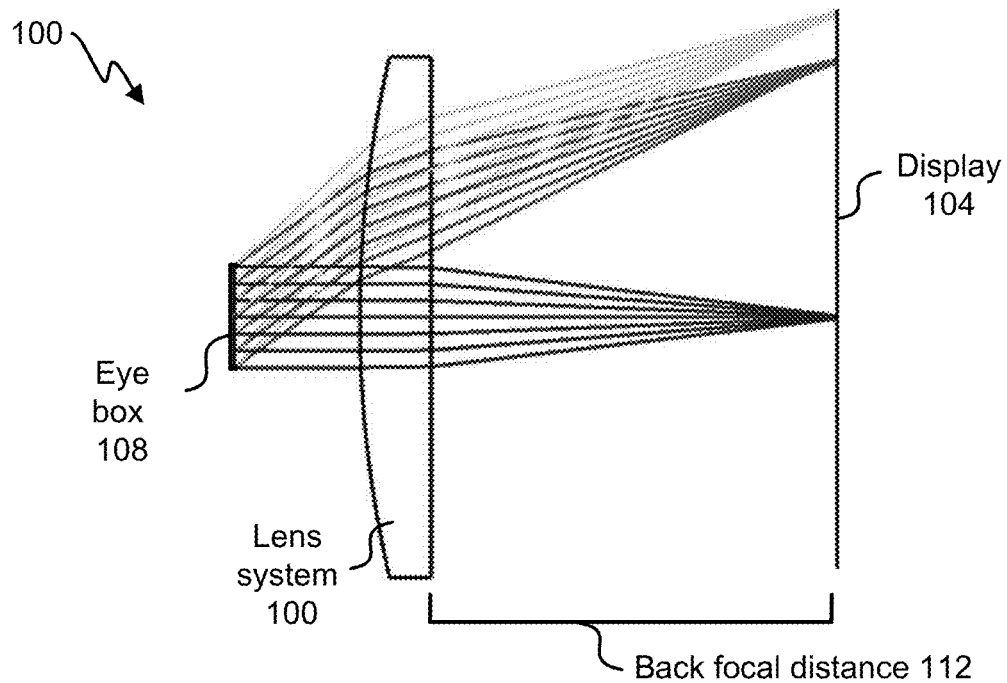
FIG. 1 illustrates a ray-tracing diagram of an embodiment of a display system focusing light to an eye box.

FIG. 1 illustrates a ray-tracing diagram of an embodiment of a lens system 100 focusing light from a display 104 to an eye box 108. In some virtual-reality (VR) systems, light from the display 104 is transmitted to the lens system 100, and the lens system 100 magnifies the display 104 by focusing light from the display 104 to the eye box 108. The lens system 100 comprises one or more lenses. The lens system 100 is separated from the display 104 by a back focal distance 112. The VR system is worn by a user so that an eye of the user is positioned at the eye box 108.

Figure 2:
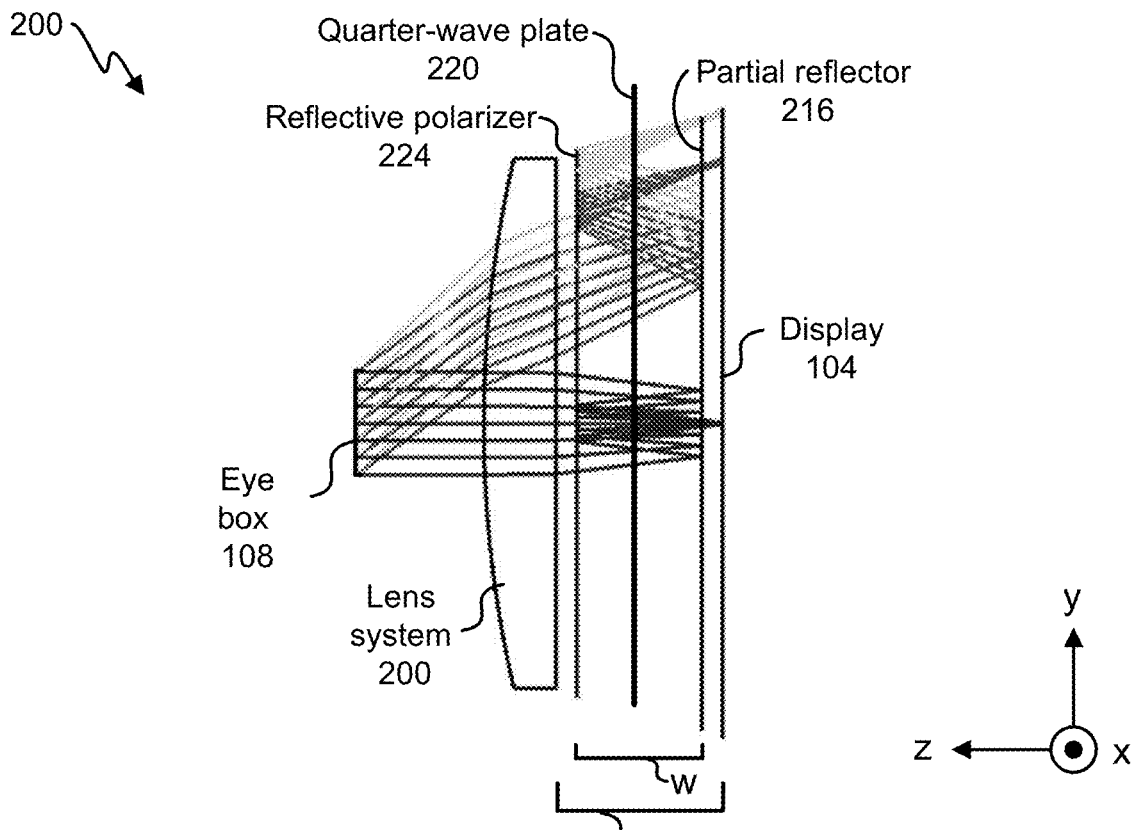
FIG. 2 illustrates a ray tracing diagram of an embodiment of folding optics between the display and a lens system.

FIG. 2 illustrates a ray tracing diagram of an embodiment of folding optics between a 104 display and a lens system 200. The display 104 is an optical display. Light from the display 104 is transmitted to the lens system 200. The lens system 200 magnifies the display 104 by focusing light from the display 104 to the eye box 108. In some embodiments, the lens system 200 is similar to the lens system 100. The lens system 200 is separated from the display 104 by a back focal distance 212. The back focal distance 212 is shorter than the back focal distance 112 because of folding optics. The folding optics comprise a partial reflector 216, a quarter-wave plate (QWP) 220, and a reflective polarizer 224. The quarter-wave plate 220 is between the partial reflector 216 and the reflective polarizer 224. The reflective polarizer 224 is between the partial reflector 216 and the lens system 200.

The lens system 100 often uses Fresnel or smooth lenses because of ease of manufacturing. A compromise between image quality and weight sometimes leads to the lens system 100 with few elements that collectively have a relatively long focal length, and hence a relatively long back focal distance 112. The back focal distance 112 is usually full of air and can significantly increase a volume and/or bulkiness of a head-mounted display (e.g., for use as a VR headset). By using folding optics, the back focal distance 212 is reduced compared to the back focal distance 112 of FIG. 1 (e.g., close to three times shorter).

Some folding optics are used to replace the lens system 100 by using curved surfaces for the partial reflector 216, the quarter-wave plate 220, and the reflective polarizer 224. The embodiment in FIG. 2 uses folding optics to reduce the back focal distance 212 and not necessarily to replace the lens system 200. One potential problem of using folding optics with highly curved surfaces to replace the lens system 200 is a viability of curved polarization components (e.g., the QWP 220 and/or the reflective polarizer 224) having good optical quality. Another potential problem of using folding optics with highly curved surfaces on a thick-lens element is that birefringence properties of the thick-lens element can lead to poor optical quality. Thus in some embodiments, folding optics, such as the partial reflector 216, the quarter-wave plate 220, and/or the reflective polarizer 224 are on flat surfaces. In some embodiments, a flat surface has a radius of curvature equal to or greater than 1 m, 10 m, or 100 m. In the embodiment in FIG. 2, air separates the partial reflector 216 from the quarter-wave plate 220, and air separates the quarter-wave plate 220 from the reflective polarizer 224.

Light from the display 104 is transmitted to the partial reflector 216. A portion of light is transmitted through the partial reflector 216, through the quarter-wave plate 220, and to the reflective polarizer 224. The portion of light is reflected off the reflective polarizer 224, through the quarter-wave plate 220, and to the partial reflector 216. The portion of light is then reflected from the partial reflector 216 back through the quarter-wave plate 220, and is transmitted through the reflective polarizer 224 because the portion of light has changed polarization through reflections and/or transmitting through the quarter-wave plate 220. After the portion of light is transmitted through the reflective polarizer 224, it is focused to the eye box 108 using the lens system 200. The lens system 200 provides a majority a focal power of the system. In some embodiments, the lens system 200 provides all the focal power of the system. In some embodiments, the folding optics are on optical surfaces that are used for aberration correction (e.g., on an aspherical surface to help correct for field curvature).

A distance w is a distance between the partial reflector 216 and the reflective polarizer 224. In some embodiments, the reflective polarizer 224 is mounted on the lens system 200 and the partial reflector 216 is mounted on the display 104; the distance w equals the back focal distance 212, and the distance w equals one third the back focal distance 112 in FIG. 1.

A Cartesian coordinate system is shown where the z-axis (going from right to left on the page) is a horizontal axis in the direction of light propagation; the y-axis (going from bottom to top of the page) is a vertical axis; and the x-axis (going out of the page) is a horizontal axis, orthogonal to the z-axis.

Figure 3:
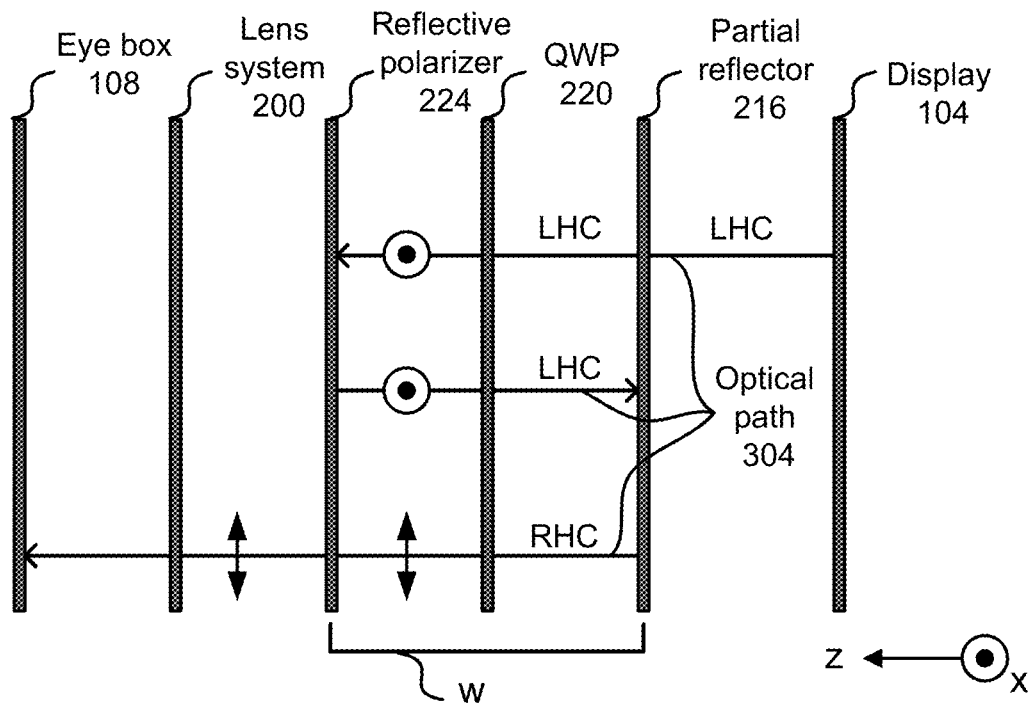
FIG. 3 depicts a schematic of an embodiment of an optical path of folding optics.

FIG. 3 depicts a schematic of light polarization of an optical path 304 in an embodiment of a folding optics system. The optical path 304 is along the z-axis. The y-axis is not shown because the schematic in FIG. 3 is for describing light polarization as light bounces for the reflecting optics.

The display 104 emit light. Light from the display 104 is transmitted to the partial reflector 216. Light between the display 104 and the partial reflector 216 is left-handed, circularly-polarized (LHC). Light between the display 104 and the partial reflector 216 is left-handed, circularly-polarized because the light could be emitted from the display 104 as left-handed, circularly-polarized, or light from the display 104 could be linearly polarized and passes through a second quarter-wave plate.

A portion of light from the display 104 is transmitted through the partial reflector 216. In some embodiments, the partial reflector 216 has a transmission of 50% and reflectance of 50% (e.g., the partial reflector 216 has transmission of 50%+/−2, 5, 10, or 15%). Thus 50% of the light from the display 104 is reflected by the partial reflector 216, and lost.

The portion of light transmitted by the partial reflector 216 is left-handed, circularly-polarized light and is transmitted to the quarter-wave plate 220. The quarter-wave plate 220 has a fast axis oriented at 45° with respect to the x-axis. Left-handed, circularly-polarized light passing through the quarter-wave plate 220 in a positive z-direction will be linearly polarized in a direction of the x-axis. Light linearly polarized along the x-axis is sometimes referred to as p-polarized light. Light linearly polarized along the y-axis is sometimes referred to as s-polarized light.

The reflective polarizer 224 transmits s-polarized light and reflects p-polarized light. Thus the p-polarized light traveling in the positive z-direction from the quarter-wave plate 220 will reflect from the reflective polarizer 224, and will be reflected as p-polarized light traveling in the negative z-direction. P-polarized light reflected from the reflective polarizer 224 will pass through the quarter-wave plate 220 a second time and be converted back into left-handed, circularly-polarized light. After passing through the quarter-wave plate 220 a second time, and traveling in the negative z-direction, the portion of light will reflect from the partial reflector 216 (and 50% will be transmitted in the negative z-direction and be lost; thus a total of 75% of light from the display 104 is lost by using the partial reflector 216 in FIG. 2).

The portion of light is reflected from the partial reflector 216 as right-handed, circularly-polarized (RHC) light. The right-handed, circularly-polarized light reflected from the partial reflector 216 passes through the quarter-wave plate 220, a third time (a second time in the positive z-direction), and is converted into s-polarized light. S-polarized light from the quarter-wave plate 220 is passed by the reflective polarizer 224 because the reflective polarizer 224 passes s-polarized light. Passed light from the reflective polarizer 224 is transmitted to the lens system 200. The lens system 200 focuses the portion of light to the eye box 108. The lens system 200 provides a majority of focusing power of light from the display 104. In some embodiments, the lens system 200 provides 85%, 90%, 95%, or greater focusing power of light from the display 104 to the eye box 108 (e.g., the folding optics provide less than 15%, 10%, or 5% of focusing power). Because of a double bounce in the folding optics, the back focal distance 212 can be reduced by close to 3 times.

The reflective polarizer 224 and/or the quarter-wave plate 220 can be extremely thin (within mechanical limits) so as to reduce effects of birefringence. The partial reflector 216, the quarter-wave plate 220, and/or the reflective polarizer 224 can be flat with little or no loss to resolution of the lens system 200. In some embodiments, the partial reflector 216 is curved and/or applied to a lens (e.g., a plastic or glass lens) to reduce field curvature of the lens system 200. Having the partial reflector 216 on a surface to compensate for field curvature works particularly well since the partial reflector 216 is close to the display 104.

Figure 4:
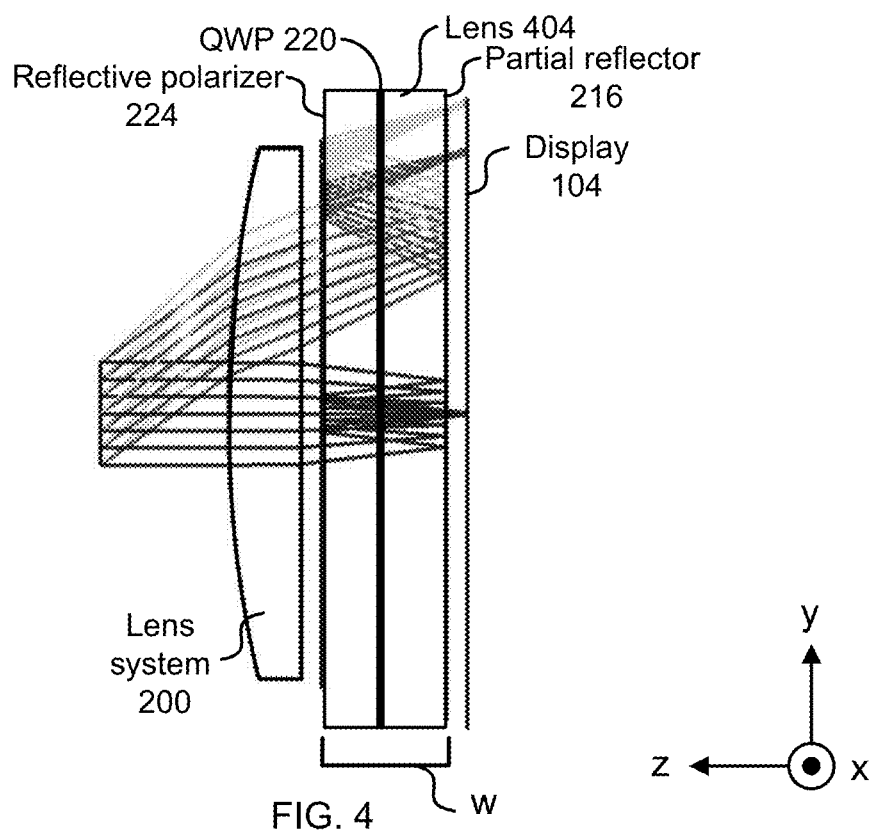
FIG. 4 illustrates a ray tracing diagram of an embodiment of folded optics in a non-air medium.

FIG. 4 illustrates a ray tracing diagram of an embodiment of folded optics in a medium. The partial reflector 216 and the reflective polarizer 224 are applied to opposite surfaces of a lens 404. The lens 404 is glass or plastic. The quarter-wave plate 220 is between the partial reflector 216 and the reflective polarizer 224. In some embodiments, the lens 404 comprises a first half and a second half. The quarter-wave plate 220 is applied to a surface of the first half of the lens 404; the reflective polarizer 224 is applied to another surface of the first half of the lens 404; the partial reflector 216 is applied to a first surface of the second half of the lens 404; and a second surface of the second half of the lens 404 is blank. The quarter-wave plate 220 on the first half is bonded to the blank second surface of the second half. In some embodiments, the reflective polarizer 224 is on a surface of the lens system 200, and/or the quarter-wave plate 220 and the partial reflector 216 are on opposite sides of the lens 404. Surfaces of the lens 404 can be flat (e.g., radius of curvature larger than 1 m, 10 m, or 100 m) for ease of manufacturing. In some embodiments, surfaces of the lens 404 are curved (e.g., surfaces of the reflective polarizer 224 and/or the partial reflector 216) to help compensate for aberrations of the lens system 200 and/or to provide increased optical power, in addition to the lens system 200. Other combinations (e.g., mixing optical elements from FIG. 2 and FIG. 4) are possible. For example, the quarter-wave plate 220 could be applied to a flat surface of lens 404; the reflective polarizer 224 could be applied to a curved surface of the lens 404; and the partial reflector could be a separate optical element from the lens 404 (e.g., an air gap separates the quarter-waveplate 220, which is on lens 404, from the partial reflector 216).

Figure 5:
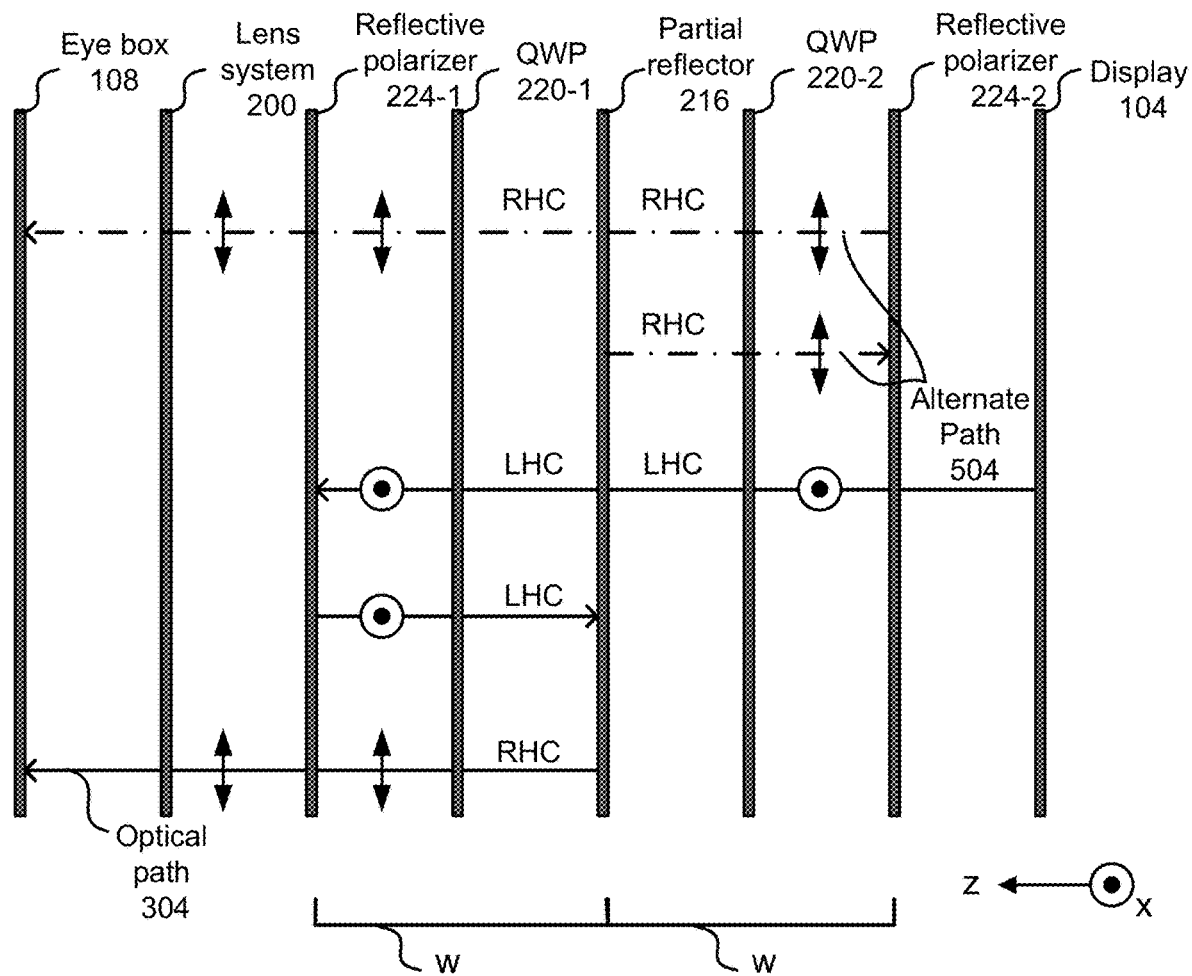
FIG. 5 depicts a schematic of optical paths of an embodiment of folding optics with two reflective polarizers and two quarter-wave plates.

FIG. 5 depicts a schematic of optical paths of an embodiment of folding optics with two reflective polarizers and two quarter-wave plates. A potential drawback of using folding optics is loss of light from the display. In the embodiment in FIG. 2, 75% of light from the display 104 is lost (e.g., by reflection and/or transmission at the partial reflector 216). By adding additional elements, 25% of the light from the display 104 can be recovered.

The embodiment in FIG. 5 depicts the display 104, the partial reflector 216, a first quarter-wave plate 220-1, a first reflective polarizer 224-1, the lens system 200, and the eye box 108. The display 104, the partial reflector 216, the first quarter-wave plate 220-1, the first reflective polarizer 224-1, and the lens system 200 function as they do in FIG. 3. The system depicted in FIG. 5 further comprises a second quarter-wave plate 220-2 and a second reflective polarizer 224-2. The second quarter-wave plate 220-2 and the second reflective polarizer 224-2 are used to recover some of the light that is reflected at the partial reflector 216, which otherwise would be lost. An alternate path 504 shows light traveling from the partial reflector 216, through the second quarter-wave plate 220-2, reflecting off the second reflective polarizer 224-2, and transmitting to the lens system 200 to be focused to the eye box 108.

The second reflective polarizer 224-2 is between the display 104 and the partial reflector 216. The second quarter-wave plate 220-2 is between the second reflective polarizer 224-2 and the partial reflector 216. The second reflective polarizer 224-2 is configured to pass p-polarized light (e.g., oriented orthogonally to the first reflective polarizer 224-1; 90 degrees, +/−1, 3, 5, or 10 degrees). Light from the display 104 is either p-polarized or p-polarized by the second reflective polarizer 224-2.

The second quarter-wave plate 220-2 has a fast axis oriented at 135° from the x-axis in an x-y plane (e.g., clocked by 90 degrees, +/−1, 3, or 5 degrees, from the first quarter-wave plate 220-1; orthogonal). P-polarized light traveling from the second reflective polarizer 224-2 will be converted to left-handed, circularly-polarized (LHC) light by the second quarter-wave plate 220-2.

A first portion of light from the display 104 will transmit through the partial reflector 216 as left-handed, circularly-polarized light along the optical path 304, as described in conjunction with FIG. 3. A second portion of light from the display 104 is reflected from the partial reflector 216. Left-handed, circularly-polarized light reflecting from the partial reflector 216 will be reflected as right-handed, circularly-polarized light and be transmitted toward the second quarter-wave plate 220-2 in a negative z-direction. Right-handed, circularly-polarized light transmitting through the second quarter-wave plate 220-2 will be converted into s-polarized light. The second portion of light, after being transmitted through the second quarter-wave plate 220-2, will be reflected as s-polarized light off the reflective polarizer 224-2. S-polarized light traveling in the positive z-direction will pass through the second quarter-wave plate 220-2 and be converted back into right-handed, circularly-polarized light. The second portion of light will then pass through the partial reflector 216 (and half the light traveling along the alternate path 504 will be reflected at the partial reflector 216 and lost) as right-handed, circularly-polarized light. The second portion of light passing through the partial reflector 216 will pass through the first quarter-wave plate 220-1 and be converted back into s-polarized light. Since the first reflective polarizer 224-1 passes s-polarized light, the second portion of light will pass through the first reflective polarizer 224-1. The second portion of light, after passing through the first reflective polarizer 224-1, will be focused by the lens system 200 to the eye box 108.

While 75% of light from the display 104 is lost in the embodiment in FIG. 3, only 50% of light from the display 104 is lost in the embodiment in FIG. 5. Twenty-five percent of light from the display 104 is lost by passing through the partial reflector 216 in the negative z-direction along the optical path 304, and 25% of light from the display 104 is lost by reflecting on the partial reflector 216 while propagating along the alternate path 504 in the positive z-direction. In some embodiments, the partial reflector 216 has a transmission of 50%, +/−1, 2, or 3% to reduce total light loss due to the partial reflector 216.

To keep a path length of the optical path 304 after the partial reflector 216 equal to a path length of the alternate path 504, the second reflective polarizer 224-2 is equal distance away from the partial reflector 216 as the first reflective polarizer 224-1. Put another way, the distance from the partial reflector 216 to the first reflective polarizer 224-1 is w; and the distance between the partial reflector 216 and the second reflective polarizer 224-2 is w. Thus the folding optics in FIG. 5 has a width of 2w, which is wider than the width w of the folding optics in the embodiment in FIG. 3.

Figure 6:
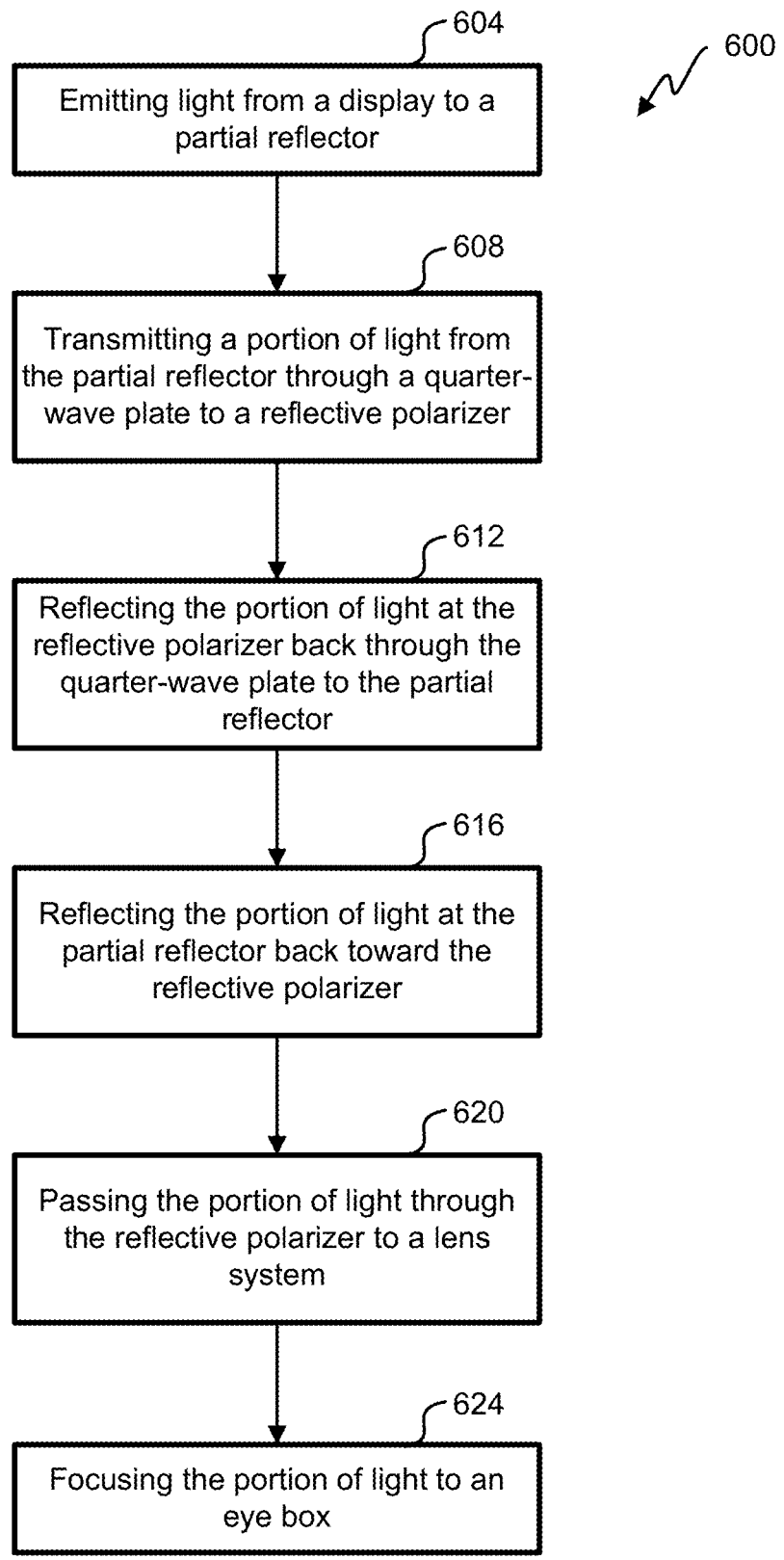
FIG. 6 illustrates an embodiment of a flowchart of a process for using a lens system and folded optics in virtual-reality display.

FIG. 6 illustrates an embodiment of a flowchart of a process 600 for using a lens system 200 and folding optics in virtual-reality display. Process 600 begins in step 604 with emitting light from the display 104 to the partial reflector 216 (e.g., see FIG. 3). In step 608, a portion of light is transmitted from the partial reflector 216, through the quarter-wave plate 220, and to the reflective polarizer 224. The portion of light is reflected at the reflective polarizer 224 back through the quarter-wave plate and to the partial reflector 216, step 612. The partial reflector 216 reflects the portion of light back through the quarter-wave plate 220 and toward the reflective polarizer 224, step 616. In step 620, the portion of light is passed through the reflective polarizer 224 to the lens system 200. The lens system 200 focuses the portion of light to the eye box 108, step 624. Light is focused to the eye box after being transmitted through the reflective polarizer.

Figure 7:
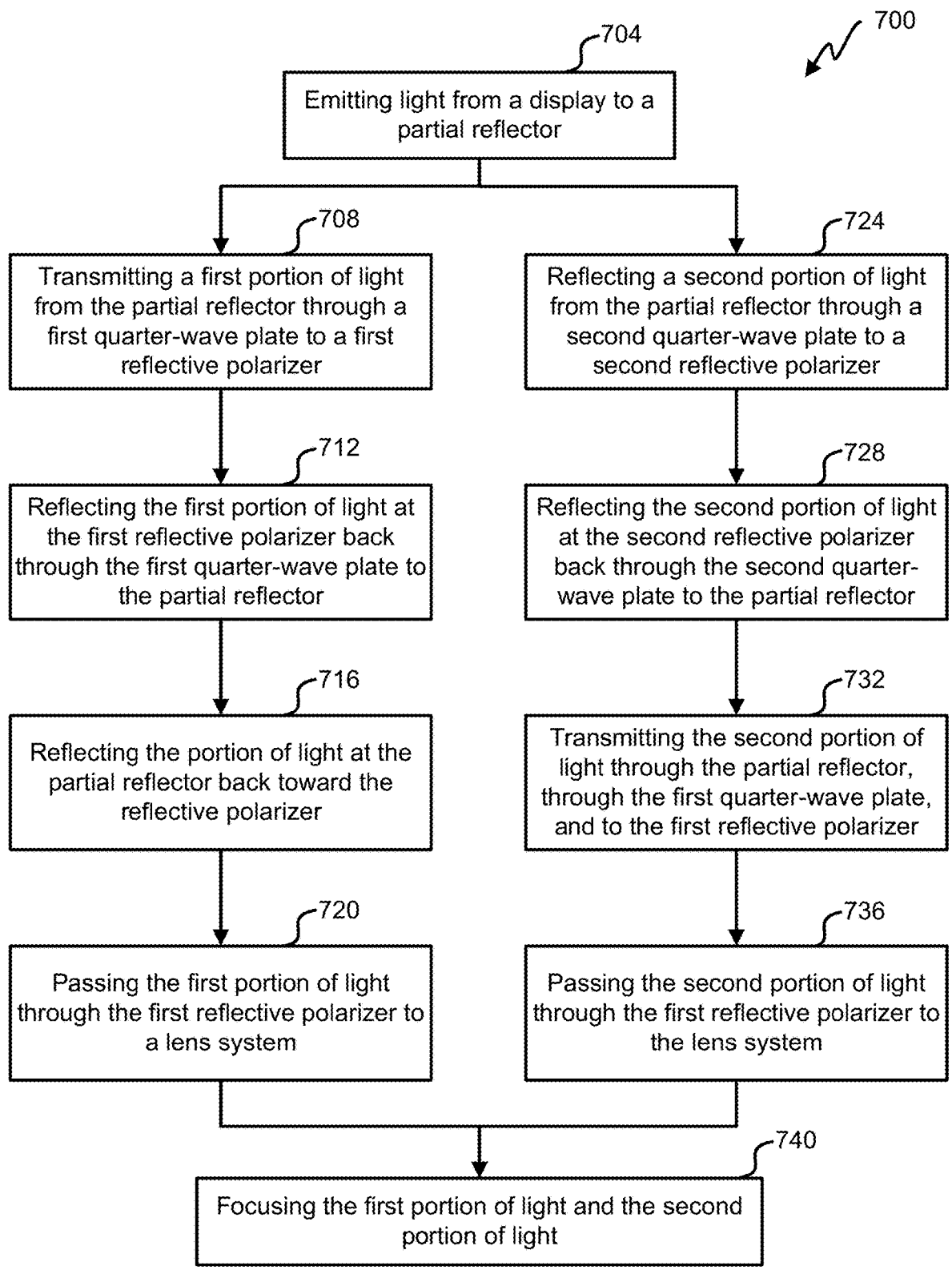
FIG. 7 illustrates an embodiment of a flowchart of a process for using a folded optics with two reflective polarizers and two quarter-wave plates.

FIG. 7 illustrates an embodiment of a flowchart of a process 700 for using a folding optics with two reflective polarizers and two quarter-wave plates (e.g., see FIG. 5). Process 700 begins in step 704 with emitting light from the display 104 to a partial reflector 216. In step 708, a first portion of light is transmitted from the partial reflector 216 through the first quarter-wave plate 220-1 and to the first reflective polarizer 224-1. The first portion of light follows the optical path 304. The first portion of light is reflected at the first reflective polarizer 224-1 back through the first quarter-wave plate 220-1 to the partial reflector 216, step 712. The partial reflector 216 reflects the first portion of light back through the first quarter-wave plate 220-1 and toward the first reflective polarizer 224-1, step 716. In step 720, the first portion of light is passed through the first reflective polarizer 224-1 to the lens system 200.

In step 724, a second portion of light is reflected from the partial reflector 216 through a second quarter-wave plate 220-2 and to a second reflective polarizer 224-2. The second portion of light follows the alternate path 504. The second portion of light upon reflecting from the partial reflector 216 is converted from left-handed, circularly-polarized light into right-handed, circularly-polarized light. The second portion of light travels from the partial reflector 216 to the second reflective polarizer 224-2 in the negative z-direction. Right-handed, circularly-polarized light traveling in the negative z-direction through the second quarter-wave plate 220-2 is changed from right-handed, circularly-polarized light into s-polarized light. In step 728, the second portion of light is reflected from the second reflective polarizer 224-2 because the second reflective polarizer 224-2 reflects s-polarized light and transmits p-polarized light. S-polarized light reflected from the second reflective polarizer 224-2 reflected as s-polarized light and is transmitted to the second quarter-wave plate 220-2. S-polarized light transmitting through the second quarter-wave plate 220-2 is converted into right-hand, circularly-polarized light. The second portion of light is transmitted through the partial reflector 216 (e.g., and 50% of light incident on the partial reflector 216, after being reflected by the second reflective polarizer 224-2, is reflected by the partial reflector 216), step 732. The second portion of light passing through the partial reflector 216 is transmitted through the first quarter-wave plate 220-1 and to the first reflective polarizer 224-1. Right-handed, circularly-polarized light transmitted through the first quarter-wave plate 220-1 is converted into s-polarized light. S-polarized light is transmitted through the first reflective polarizer 224-1, step 736, because the first reflective polarizer 224-1 passes s-polarized light and reflects p-polarized light. After passing through the first reflective polarizer 224-1, the second portion of light is transmitted to the lens system 200.

In step 740, the lens system 200 focuses the first portion of light and the second portion of light to the eye box 108. The first reflective polarizer 224-1 and the second reflective polarizer 224-2 are equidistant from the partial reflector 216, e.g., so that the first portion of light traveling along the optical path 304 after transmission through the partial reflector has the same distance as the second portion of light traveling along the alternate path 504. Thus, the lens system 200 focuses the first portion of light at the same time as focusing the second portion of light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. For example, a circular polarizer can be used in addition to, or in lieu of, a linear polarizer for a reflective polarizer 224. In some embodiments, the system comprises an opaque housing as part of a head-mounted display, wherein the lens system 200 and reflective polarizer 224, the quarter-wave plate 220, the partial reflector 216, and/or the display 104 are enclosed in the opaque housing such as to block ambient light to eyes of the user while the head-mounted display is worn by the user. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
an optical display;
a lens system;
a partial reflector between the lens system and the optical display;
a first quarter-wave plate between the lens system and the partial reflector;
a first reflective polarizer between the lens system and the first quarter-wave plate, wherein a majority of focusing power of the system comes from the lens system;
a second reflective polarizer, wherein:
the partial reflector is between the first reflective polarizer and the second reflective polarizer;
the first reflective polarizer has a transmission axis in a first orientation;
the second reflective polarizer has a transmission axis in a second orientation; and
the first orientation is orthogonal to the second orientation; and
a second quarter-wave plate, wherein the second quarter-wave plate is between the partial reflector and the second reflective polarizer.

2. The system of claim 1, wherein:
the first quarter-wave plate is on a flat surface; and
the first reflective polarizer is on a flat surface.

3. The system of claim 1, wherein the partial reflector is on an aspherical surface.

4. The system of claim 1, wherein the partial reflector is on a flat surface.

5. The system of claim 1, wherein the partial reflector has a transmission of 50%, +/−5%.

6. The system of claim 1, wherein the partial reflector, the first quarter-wave plate, and the first reflective polarizer provide an on-axis fold of light from the optical display.

7. The system of claim 1, wherein the first reflective polarizer and the second reflective polarizer are equidistant from the partial reflector.

8. The system of claim 1, wherein:
the first reflective polarizer transmits linearly-polarized light of a first orientation and reflects linearly-polarized light of a second orientation; and
the first orientation is orthogonal to the second orientation.

9. A system comprising:
an optical display;
a partial reflector;
a first quarter-wave plate, wherein the partial reflector is between the optical display and the first quarter-wave plate;
a first reflective polarizer, wherein the first quarter-wave plate is between the first reflective polarizer and the partial reflector;
a second quarter-wave plate, wherein the second quarter-wave plate is between the optical display and the partial reflector; and
a second reflective polarizer, wherein the second reflective polarizer is between the optical display and the second quarter-wave plate, wherein the first reflective polarizer and the second reflective polarizer are equidistant from the partial reflector.

10. The system of claim 9, further comprising a lens system for focusing light from the optical display to an eye box.

11. The system of claim 9, wherein:
the first quarter-wave plate has a fast axis in a first orientation;
the second quarter-wave plate has a fast axis in a second orientation; and
the first orientation is offset from the second orientation by 90 degrees, +/−5 degrees.

12. The system of claim 9, wherein:
the first reflective polarizer has a transmission axis in a first orientation;
the second reflective polarizer has a transmission axis in a second orientation; and
the first orientation is offset from the second orientation by 90 degrees, +/−5 degrees.

13. The system of claim 9, wherein:
the first quarter-wave plate is on a flat surface; and
the first reflective polarizer is on a flat surface.

14. The system of claim 9, wherein the partial reflector has a transmission of 50%, +/−5%.

15. A method comprising:
emitting light from a display to a partial reflector;
transmitting a first portion of light from the partial reflector through a first quarter-wave plate to a first reflective polarizer;
reflecting the first portion of light at the first reflective polarizer back through the first quarter-wave plate to the partial reflector;
reflecting the first portion of light at the partial reflector back toward the first reflective polarizer;
passing the first portion of light through the first reflective polarizer to a lens system;
using the lens system to focus the first portion of light to an eye box;

reflecting a second portion of light from the partial reflector through a second quarter-wave plate to a second reflective polarizer, wherein the first reflective polarizer and the second reflective polarizer are equidistant from the partial reflector;

reflecting the second portion of light at the second reflective polarizer back through the second quarter-wave plate toward the partial reflector;

transmitting the second portion of light through the partial reflector, through the first quarter-wave plate, and to the first reflective polarizer;

passing the second portion of light through the first reflective polarizer to the lens system; and using the lens system to focus the second portion of light to the eye box.

16. The method claim 15, wherein:

the first reflective polarizer has a transmission axis in a first orientation;

the second reflective polarizer has a transmission axis in a second orientation; and the first orientation is offset from the second orientation by 90 degrees, +/−5 degrees.

17. The method of claim 15, wherein:

the first quarter-wave plate has a fast axis in a first orientation;

the second quarter-wave plate has a fast axis in a second orientation; and the first orientation is offset from the second orientation by 90 degrees, +/−5 degrees.

18. The method of claim 15, further comprising transmitting light from the display through the second quarter-wave plate before transmitting light from the display to the partial reflector.

19. The method of claim 15, wherein:

the first quarter-wave plate is on a flat surface; and the first reflective polarizer is on a flat surface.

20. The method of claim 15, wherein the partial reflector is on a surface used to correct for field-curvature.

* * * * *